United States Patent [19]
Pike

[11] 4,335,543
[45] Jun. 22, 1982

[54] METHOD AND MEANS OF MANUFACTURING AN IMPROVED DISC REEL MOWER

[76] Inventor: Carl A. Pike, 13600 S. Prairie Ave., Hawthorne, Calif.

[21] Appl. No.: 236,882

[22] Filed: Feb. 23, 1981

Related U.S. Application Data

[62] Division of Ser. No. 140,254, Apr. 14, 1980, Pat. No. 4,267,690.

[51] Int. Cl.³ .............................................. B24B 21/02
[52] U.S. Cl. ................................. 51/145 R; 51/225; 51/285; 51/288
[58] Field of Search ............... 51/145 R, 218 T, 222, 51/225, 237 B, 285, 288, 144

[56] References Cited

U.S. PATENT DOCUMENTS

| | | | |
|---|---|---|---|
| 2,376,847 | 5/1945 | Glike | 51/145 R |
| 3,020,682 | 2/1962 | Spetzler | 51/145 R |
| 3,668,814 | 6/1972 | Freerks | 51/145 R |

FOREIGN PATENT DOCUMENTS 1577529  7/1970  Fed. Rep. of Germany .... 51/145 R Primary Examiner—Harold D. Whitehead
Attorney, Agent, or Firm—Knobbe, Martens, Olson, Hubbard & Bear

[57] ABSTRACT

A continuous abrading belt means and method for manufacturing an improved mowing machine of the type which includes a bed knife, a cylindrical rotary knife which, in turn, comprises a plurality of generally elliptical discs mounted parallel to each other on a shaft, and means for rotating the cylindrical knife construction in peripheral contact with the bed knife is disclosed.

3 Claims, 11 Drawing Figures

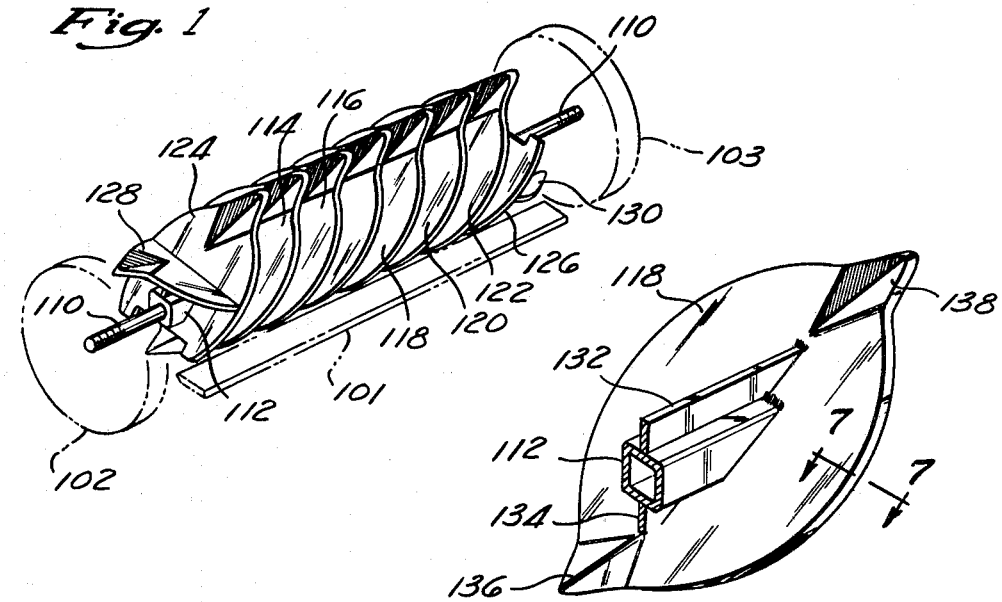
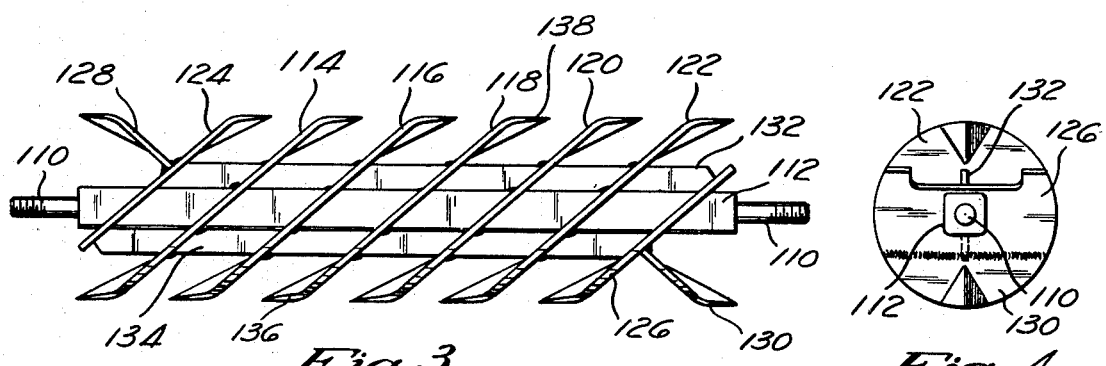
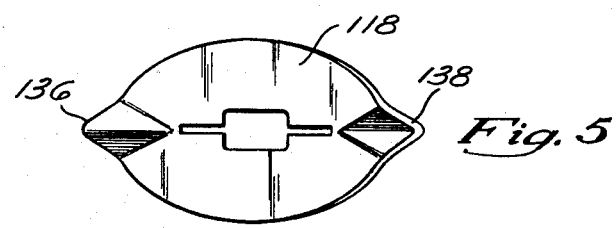
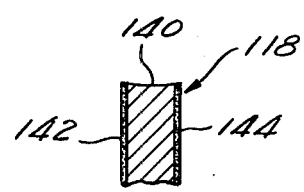
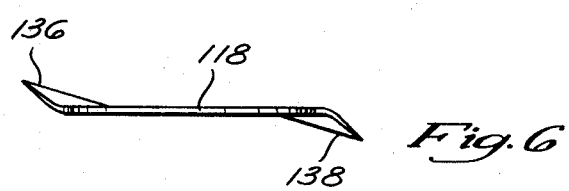

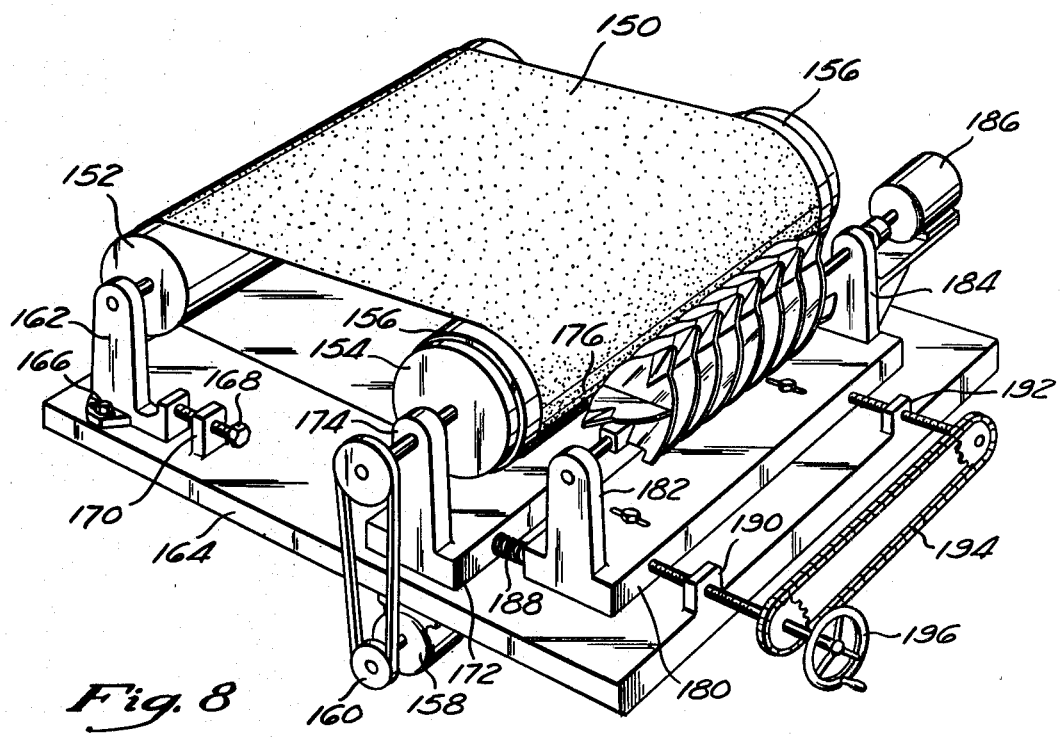
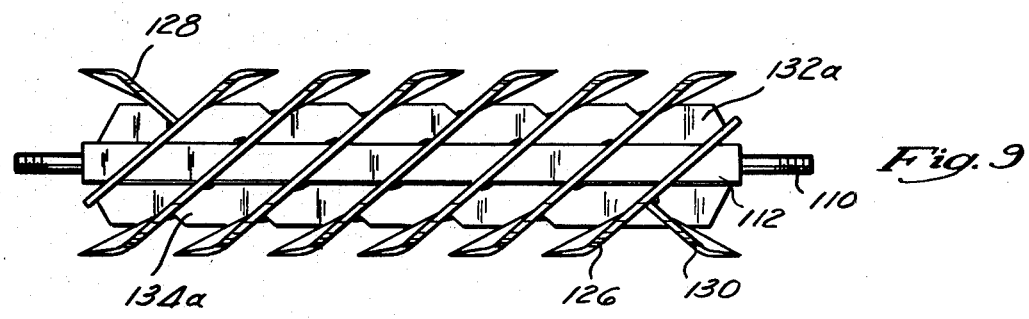
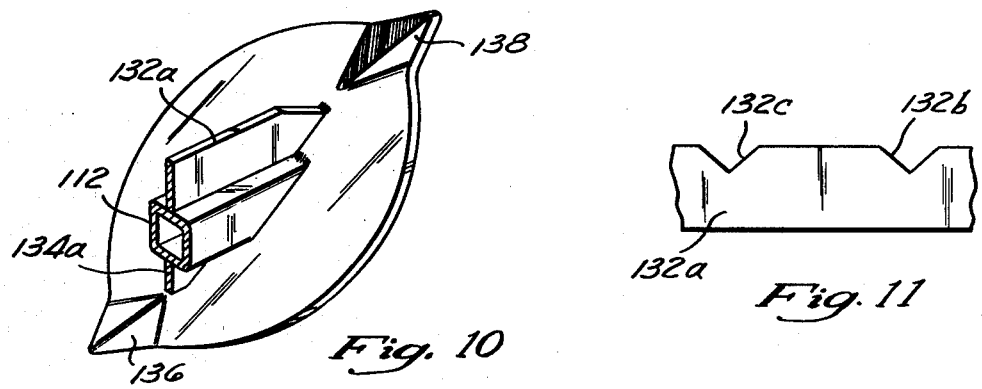

METHOD AND MEANS OF MANUFACTURING AN IMPROVED DISC REEL MOWER

This application is a division of application Ser. No. 140,254 filed Apr. 14, 1981 and now U.S. Pat. No. 4,267,690 dated May 19, 1981.

TECHNICAL FIELD

This invention relates to mowing machines, and, more specifically, relates to a machine and a method of manufacturing a mowing machine reel.

In the conventional "reel" type of lawn mower, a bed knife, which is simply an elongate knife with a straight cutting edge, is traditionally provided. Sometimes the bed knife has notched edges or teeth formed on the edge. The reel is a cylindrical knife construction. Most reel mowers are made up of a plurality of serpentine-shaped elongate knives which, together, define a cylindrical surface. When the reel rotates, the cylindrical surface of the knife construction moves adjacent the bed knife and presents a cutting configuration to the grass, weeds, and the like as the mower moves across the lawn or the field.

Another form of reel mower which has been proposed, utilizes elliptical discs which lie generally parallel to each other but at an acute angle relative to the shaft of the reel and, of course, relative to the axis of the cylinder formed by the peripheral edges of the elliptical discs. As the reel is rotated, the peripheral edges of the elliptical discs are presented to the bed knife in a relative cutting relationship insofar as the grass is concerned. These reels have never gained acceptance. While there are some advantages which would appear to result from this type of reel construction, these advantages have not been realized because of difficulties and problems which heretofore have not been solved. It is recognized, for example, that there is somewhat less tendency of the elliptical-disc type reel mowers to throw rocks and debris great distances. Somewhat taller grass can be accommodated and there is some savings in power consumption.

A number of problems have for many years remained unresolved, however. One of the problems has been that it has been virtually impossible to manufacture and maintain the discs in relative parallel relationship. A closely related problem involves the difficulty in manufacturing the discs and fitting them around a single round shaft in such a way as to present the major axes of the ellipses of the discs in a straight line. An additional related difficulty has been that the discs tend to flex severely along the major axes thereof with the result that near the contact point between the major axis of a given disc and the bed knife, there becomes a wider gap which may simply widen as tough grass stems or other items come between the bed knife and the disc peripheral cutting edge. Disc failure, because of continuous flexing, has plagued these devices as well.

Another very serious drawback has been the tendency of these elliptical disc reel type mowers to give a "ripple" effect to the grass as it is mowed. As the major axes of the conventional, prior art, elliptical disc approaches the bed knife, there is a less and less acute cutting angle between the bed knife and the periphery of the disc at its major axis. Thus, the grass tends to be incompletely cut or cut somewhat longer than grass where the contact is at the minor axes of the elliptical discs. This leaves a rill of uncut or longer grass and gives a "ripple" effect to a lawn.

Manufacturing problems remained. It was extremely difficult to line the axes of the blades up so that a single cylindrical reel could be formed, and sharpening of these reels presented an almost impossible situation. Many kinds of grinding machines and other sharpening devices were utilized, but none were successful. The present invention is designed to solve these problems and has overcome the extremely serious problems of the prior art.

DISCLOSURE OF THE INVENTION

Mowing machines of the general construction which include an elongate bed knife, a generally cylindrical rotary knife construction which, in turn, comprises a plurality of generally elliptical discs mounted on a shaft lying generally in parallel planes to each other but at an acute angle to the shaft axis and means for rotating the knife construction such that the periphery of the discs move in close proximity with the elongate bed knife, thereby presenting a cutting combination to grass and the like between the elongate knife and the respective discs are here considered.

The discs have ears extending outwardly in opposite directions from the plane of the discs, the ears being formed at the respective ends of the major axes of the respective discs, the discs also having generally rectangular apertures therethrough with slots extending outwardly along the major axes of the discs from the ends of these rectangular apertures toward the ears on the discs. These rectangular apertures fit over a generally square shaft, the diameter of the shaft and the length of the rectangular portion of the aperture being such that the discs rest with the ends of the rectangular apertures against the sides of the square shaft such that the planes of the discs are at an angle of about 40 degrees, preferably, and generally at an angle of about 30 to 50 degrees relative to the axis of the shaft. A pair of elongate flat supporting bars extend through the slots in the discs outwardly from the shaft to physically support the discs along the major axes thereof and to fan the grass or the like by the rotation of the knife construction during mowing. The width of the supporting bars is greater than the length of the slots in the discs and the supporting bars have formed therein a plurality of notches which are so formed and configured that one of the notch edges lies against the surface of each of the discs, proximate the shaft, thereby defining the angle of the discs relative to the shaft and to each other and to support the major axis of the discs beyond the ends of the notches therein.

The discs include planar surfaces which are case hardened, or otherwise hardened such that the surfaces for a short depth, typically from about 0.005 to about 0.0025 inch, is harder than the relatively softer central core section of the disc, looking perpendicular to the plane of the disc. The central core section comprises at least about two-thirds of the thickness of the disc and may comprise as much as nine-tenths or more of the disc thickness. Since the center of the disc is softer than the surfaces, the center tends to wear more rapidly than the surfaces leaving the hardned surfaces, which are the cutting edges, extending outwardly. Thus, the disc reel cutting edges are self-sharpening.

The present invention comprises a machine especially constructed and adapted for sharpening these mower knife constructions as disclosed. The machine comprises an elongate continuous abrading belt which has a width at least as great as the length of the knife to be sharpened. Means are provided for carrying the belt in a continuous revolving movement and to present the abrading surface of the belt at one point in its revolutionary path in a straight line. Means are provided for supporting the cylindrical knife construction and for presenting the peripheral surface of the knife construction at the straight line on the belt and for rotating the cylindrical knife construction in contact with the straight line surface of the abrading belt for thereby abrading and sharpening the periphery of the disc which comprise the knife construction.

This machine is used to carry out the method of sharpening these knives in which the elongate continuous abrading belt is moved in a continuous revolution in a straight line, the mower knife construction is pressed against the straight line configuration of the continuous abrading belt and the knife construction is rotated on its own axis, preferably in a direction opposite the direction of movement of the abrading belt, to thereby maximize the relative movement between the knife periphery and the belt surface.

BRIEF DESCRIPTION OF THE DRAWINGS

FIG. 1 is a perspective view of an elliptical disc type mower, showing in phantom lines the driving wheels at the ends of the shaft of the knife construction;

FIG. 2 is a perspective view of a single elliptical disc mounted on the shaft with the fanned support elements in place;

FIG. 3 is a side view of a reel;

FIG. 4 is an end view of the reel;

FIG. 5 is a plane view of a disc used in the manufacture of reels as shown in FIGS. 3 and 4;

FIG. 6 is a side view of a disc used in the manufacture of such reels;

FIG. 7 is a cross-sectional view of a disc taken along the lines 7—7 in the direction of the arrows as shown in FIG. 2, showing the hardened surfaces of the disc;

FIG. 8 is a perspective view of the machine for sharpening and manufacturing the reels of this invention;

FIG. 9 is a side view of another embodiment of the reel, in which a wider fan and supporting element is used to support and back up the discs along the major axes thereof;

FIG. 10 is a perspective view of the configuration of the reel shown in FIG. 9; and FIG. 11 is a side view of a portion of one of the support fanning elements.

BEST MODE FOR CARRYING OUT THE INVENTION

A reel type lawn grass and field mowing machine of the type which comprise an elongate bed knife is shown in FIG. 1 in phantom lines at 101. One or more driving wheels 102 and 103 are also shown in FIG. 1 in phantom. The driving wheels may be the support wheels for the mower or may be driven by some power or other means.

As shown in FIGS. 1 and 3, the reel comprises a shaft indicated generally at 110 which comprises a square portion 112, the general configuration of which is best shown in FIG. 4. The round portion 110 is used in the conventional way as a journal support and for attachment to whatever driving means is utilized. The reel also comprises a plurality of generally elliptical discs indicated at 114 through 122. The reel typically includes some partial ellipses, i.e., discs which are only partially in the form of an ellipse, being cutting off so as to form the end of the reels. Two end pieces 124 and 126 lie generally parallel to the other elliptical discs 114 through 122 while two short partial elliptical sections 128 and 130 are formed simply to square off the end of the cylinder formed by the discs. These latter disc segments extend generally perpendicularly to the plane of the disc elements or disc segments, but otherwise work in the same manner.

The reel also comprises a pair of support and fanning rods 132 and 134 which extend from proximate the shaft outwardly along the major axis of each of the respective elliptical discs.

FIG. 2 depicts a single elliptical disc mounted on the shaft with the support fanned element. Disc 118 out of the plurality of discs on the shaft is selected as exemplary to be depicted in FIG. 2, and in FIGS. 5 and 6. In FIG. 2 it will be seen that the rectangular aperture which is in the center of the disc 118, the major diameter of the rectangle corresponding to the major axis of the disc, is fitted over the square shaft 112. When so fitted, and allowed to rest at an angle, the plane of the disc resides at an acute angle relative to the axis of the shaft. That acute angle is about 40 degrees. Variation is permitted and any angle between about 30 degrees and between about 50 degrees can be used. Forty degrees appears to be about optimum, however.

Ears extend, as best shown in FIG. 6, in opposite directions relative to the plane of the disc, and, as best shown in FIG. 5, at the respective ends of the major axis of the disc. In disc 118, these ears are identified as ears 136 and 138. These ears formed at the periphery of the disc at the end of the major axis of the elliptical disc provide an acute angle and rapid relative movement between the disc periphery and the bed knife as the disc rotates such that the major axis approaches the bed knife.

FIG. 7 depicts the disc 118, in partial cross-section. The disc 118 has a relatively soft center core section 140 with hardened surfaces 142 and 144. The discs themselves may be formed of relatively soft steel, although somewhat hardened steel is generally preferred. It is extremely important, however, for maximum efficiency and minimum energy usage plus the savings of cost to resharpening, that the surfaces of the discs, 142, and 144, be case hardened, otherwise surface hardened, relative to the central portion 140 of the disc.

In the prior art knives, the periphery of the discs tended to wear round, i.e., the edges of the discs on the surface portions wear before the center. This resulted in a round knife edge interacting with the bed knife and often either did not cut or simply crushed the grass or other vegatation between the bed knife and the disc. This resulted in a poor quality cut and sometimes damaged the overall appearance of the lawn because of the brown resulting from crushed ends of the grass.

These problems have been overcome by providing a self-sharpening disc. It will be understood, looking at the present disclosure, that as the disc periphery rotates adjacent the blade, the center portion of the disc will wear more rapidly than the surface portions, by reason of the dirt or other abrasive material which contacts the periphery of the discs. This will leave hardened edge portions which cut cleanly and provide a self-sharpening effect.

Sharpening of these reels to provide a round cylindrical configuration and to provide a very sharp edge has, in the past, presented extremely difficult and nearly insurmountable problems. These problems have been overcome according to the present invention by the new device depicted in perspective in FIG. 8. The device of FIG. 8 comprises a continuous elongate abrading belt 150 and means, such as the drums 152 and 154 for carrying or revolving the continuous belt in a revolutionary path and presenting one portion of the lateral surface of the continuous abrading belt in a straight line on the drum 154. An extremely important and critical factor in the invention is the inclusion of a resilient surface 156, which may be a thin layer of rubber or other resilient material, on the drum 154. The thickness of this layer will be from about one-sixteenth inch to about one-half inch, generally. Any kind of desired drive means such as the motor 158 and the pulley and belt combination indicated generally at 160 may be used to drive the rollers and cause the abrading belt to revolve in a continuous path presenting a straight line backed by a resilient flat configuration. The drum 152 may be supported in any desired manner. It is desirable to provide some kind of support means such as the journaled bracket 162 which is movably mounted on the base 164 by bolts 166 which may be loosened or tightened. The bracket 162 may be moved forwardly and backwardly by means of an adjusting bolt 168 which is threadedly received through a threaded aperture in bracket 170. This combination provides means for adjusting the relative tension of the sides of the continuous belt to assure that the belt travels in a continuous path and does not rise from side-to-side in its revolution.

Likewise, any convenient means may be provided for rotationally mounting the drum 154. In the preferred embodiment, a combination bracket and platform 172 which has a journaled upward bracket portion 174 on one end and a comparable structure on the other end for receiving the shaft portions of the drum 154 is provided. This bracket arrangement fixes the position of drum 154 and defines a straight line configuration for the belt with a resilient backing means, the straight line area being indicated generally at 176. A movable mount for supporting the reel is also provided. In a simplified form, FIG. 8 depicts such a bracket as comprising a base 180 with upstanding journal bracket elements 182 and 184 and a drive means 186 for rotatably driving the blade construction once it is mounted on the brackets. The brackets provide journals or other devices for connecting the blade for rotation. Rotation is provided by the motor 186. Springs, one of which is shown at 188, or other devices for permitting the controlled adjustment of the bracket 180 forwardly and backwardly, relative to the flat surface presented by the abrading belt, are provided along with means for moving the bracket back and forth. The means for moving comprises a pair of screws threadedly received in apertures in brackets 190 and 192 which are, in simplified form, shown on the plate 164. A wheel, or other device for turning these screws, which may be interconnected in any manner, a chain and sprocket being generally indicated at 194, is provided. By turning the wheel 196, in this simplified depiction, the bracket 180 is adjustably moved toward and away from the straight line surface provided by the belt with the resilient backing.

In carrying out the manufacturing and sharpening process, the belt is caused to revolve in a continuous path to present a rearwardly resiliently cushioned straight line surface, the periphery of the elliptical discs, which are in a cylindrical configuration overall, are presented against this straight line, resiliently backed surface and, preferably, the blade is rotated, generally in a direction such that the relative peripheral movement of the discs and the surface of the abrading belt are maximized. This rotational relationship between the cylindrical surface of the cutting knife and the straight line presented by the abrading belt sharpens, with great precision and accuracy, the discs which form the cylindrical cutting blade.

It will be realized that variations, within the scope and spirit of the present teachings, may be made without departing from the invention.

What is claimed is:

1. A machine especially constructed and adapted for sharpening cylindrical mower knife constructions made up of a plurality of generally elliptical discs lying generally parallel to each other at an acute angle to the axis of the cylindrical knife construction, comprising:
   a continuous elongate abrading belt having a width at least as great as the length of the knife construction to be sharpened;
   means for carrying the belt in a continuous revolving movement to present the abrading surface at one point in the revolutionary path of the belt in a straight line lateral to the abrading surface;
   means for supporting a cylindrical knife construction for presenting the peripheral surface of said construction at said straight line on said belt; and
   means for rotating the cylindrical knife construction in contact with the straight line surface of the abrading belt for abrading and sharpening the periphery of the discs which comprise the knife construction.

2. A method for sharpening cylindrical mower knife constructions made up of a plurality of generally elliptical discs lying generally parallel to each other at an acute angle to the axis of the cylindrical knife construction, comprising the steps of:
   passing an elongate, continuous abrading belt in a continuous revolution through a straight line laterally to the belt surface;
   pressing such mower knife construction having a length less than the width of the belt against the belt at said straight line; and
   rotating said mower knife construction on its own axis relative to the direction of movement of the belt surface.

3. The method of claim 2 wherein the step of rotating the mower knife comprises rotating the mower knife such that the periphery of the construction moves in a direction opposite the direction of movement of the belt whereby maximum relative movement between the knife periphery and the belt surface results.

* * * * *